United States Patent
Mohindra

(10) Patent No.: US 11,646,836 B2
(45) Date of Patent: May 9, 2023

(54) SYSTEM AND METHOD OF COHERENT AVERAGING OF REPETITIVE SIGNALS FOR MEASUREMENT

(71) Applicant: Keysight Technologies, Inc., Santa Rosa, CA (US)

(72) Inventor: Rishi Mohindra, Milpitas, CA (US)

(73) Assignee: KEYSIGHT TECHNOLOGIES, INC., Santa Rosa, CA (US)

(*) Notice: Subject to any disclaimer, the term of this patent is extended or adjusted under 35 U.S.C. 154(b) by 171 days.

(21) Appl. No.: 17/179,488

(22) Filed: Feb. 19, 2021

(65) Prior Publication Data

US 2022/0271879 A1    Aug. 25, 2022

(51) Int. Cl.
*H04L 5/00* (2006.01)
*H04L 1/24* (2006.01)
*H04L 1/20* (2006.01)
*H04L 1/18* (2006.01)
*H04L 1/1812* (2023.01)

(52) U.S. Cl.
CPC .......... *H04L 5/0007* (2013.01); *H04L 1/1819* (2013.01); *H04L 1/203* (2013.01); *H04L 1/24* (2013.01)

(58) Field of Classification Search
CPC ..... H04L 5/0007; H04L 1/1819; H04L 1/203; H04L 1/24
See application file for complete search history.

(56) References Cited

U.S. PATENT DOCUMENTS

| | | |
|---|---|---|
| 6,246,717 B1 | 6/2001 | Chen et al. |
| 8,116,363 B2 | 2/2012 | Shafeeu |
| 9,667,390 B2 | 5/2017 | Ahmed et al. |
| 2015/0304075 A1* | 10/2015 | Ahmed ................ H04L 1/206 375/228 |

* cited by examiner

*Primary Examiner* — Sharmin Chowdhury

(57) ABSTRACT

An apparatus and method: access repeated copies of an OFDM output signal produced by a device in response to corresponding repeated copies of an OFDM input signal; for each copy of the OFDM output signal, time align the OFDM output symbols to the OFDM input symbols, and de-rotate a phase of the OFDM output signal with respect to the OFDM input signal; coherently sum and average the copies of the OFDM output signal; determine a variance of each copy of the OFDM output signal, and an ensemble variance of all of the copies of the OFDM output signal; discard copies of the OFDM output signal whose variance differs from the ensemble variance by more than a threshold amount to produce a qualified set of copies; determine a mean value of the qualified set of copies; and determine a total noise power of the qualified set of copies from the mean value.

20 Claims, 5 Drawing Sheets

SYSTEM AND METHOD OF COHERENT AVERAGING OF REPETITIVE SIGNALS FOR MEASUREMENT

BACKGROUND

Devices and systems which transmit radio frequency (RF) signals ("RF devices"), such as mobile telephones, wireless local area network (WLAN) transceivers, etc. are typically subject to a variety of requirements or specifications regarding the RF signals which they omit, for example governing out of channel emissions and out of band emissions, including spurious signals and harmonics, distortion, noise, etc.

One important parameter which is used to quantify the performance of such RF devices, and in particular devices which transmit digitally-modulated RF signals, is the error vector magnitude (EVM) of a transmitted signal. A digitally-modulated signal transmitted by an ideal RF transmitter would have all constellation points of the transmitted signal precisely at their ideal locations. However, with real RF devices and systems, various factors in the implementation (such as modulation distortion, phase noise, carrier leakage, low image rejection ratio, etc.) can cause the actual constellation points to deviate from their ideal locations. Informally, EVM can be considered to be a measure of how far the actual constellation points are deviating from their ideal locations.

Distortion, noise, spurious signals, etc. can all degrade EVM performance, and therefore EVM provides a comprehensive measure of the quality of a signal transmitted by an RF device for use in digital communications. EVM can be measured by specialized equipment, which receives an RF signal from an RF device, and demodulates the received signal in a similar way to how a real radio demodulator does it.

Another important parameter which is used to quantify the performance of such RF devices, and in particular devices which transmit digitally-modulated RF signals, is the adjacent channel leakage ratio (ACLR) or adjacent channel power ratio (ACPR), which may be defined the ratio of the transmitted power on the assigned channel to the power received in the adjacent radio channel after a receive filter.

Often an RF signal analyzer may be employed to measure EVM and/or ACLR for an RF device. When testing an RF device, an output of a device under test ("DUT") may be connected to an input of the RF signal analyzer (for example, through a direct connection or via an antenna), and an RF signal transmitted from the transmitter of the RF device may be captured using the RF signal analyzer. Typically, the RF signal analyzer produces a baseband signal corresponding to the captured RF signal. The EVM of the RF signal transmitted from the DUT may be determined by comparing the baseband signal to a reference signal. Where the transmitted signal is an orthogonal frequency division multiplexed (OFDM) signal, conventional methods for measuring the EVM involve transforming the baseband signal and the reference signal to the frequency domain, and comparing the two transformed signals in the frequency domain. The ACLR may be determined by measuring the ratio of the RF signal power in the assigned channel bandwidth for the RF signal to the RF signal power in an adjacent channel.

In other situations, the device under test (DUT) may be an RF power outputting and/or translating device such as a power amplifier (PA). In these situations, an input of the DUT may be connected to an output of a RF signal generator and an output of the DUT may be connected to an input of an RF signal analyzer. The RF signal generator supplies an RF signal (e.g., that carries an OFDM signal) to the RF power outputting and/or translating device. The RF power outputting and/or translating device processes the supplied RF signal to produce an RF output signal. The RF signal analyzer captures the RF output signal and produces a baseband signal. Again, conventional methods for computing error vector magnitude dictate transforming the baseband signal and a corresponding reference signal to the frequency domain, and comparing the two transformed signals. Here the EVM and ACLR characterize the quality of the RF output signal from the power translating device.

As noted above, the EVM measurement typically employs a reference signal. In some cases, the reference signal may be determined from the baseband signal produced by the RF signal analyzer. In other cases, the EVM measurement may rely on a previously stored reference signal. For example, prior to the EVM measurement of a DUT, the signal analyzer may receive the reference signal from the DUT, or from the signal generator in a case where an RF power outputting and/or translating device is being tested, and store the reference signal in memory for use in the EVM measurement.

There are some issues which arise with conventional EVM and ACLR measurement techniques. For one thing, even when the input signal remains the same, the output signal can vary from time to time due to phase noise spikes, sampling jitter, noise spikes, instrument introduced glitches, instrument frequency drifts, etc., caused by the signal generator and/or the analyzer. This can lead to inconsistent and erroneous measurements of the EVM and ACLR, which may require time-consuming re-measurement and/or rejection of devices whose performance is actually within their specifications.

Accordingly, it would also be desirable to provide a system and method for determining the EVM and/or ACLR of a DUT which may provide some advantages over existing systems and methods. In particular, it may be beneficial to provide a system and method of measuring the EVM and/or ACLR of a DUT, which can obviate issues related to noise and spikes generated by the signal source and/or analyzer.

SUMMARY

As disclosed herein a method may comprise utilizing a signal analyzer comprising a processor and memory to: access repeated copies of an orthogonal frequency division multiplexed (OFDM) output signal produced by a device under test (DUT) in response to corresponding repeated copies of an OFDM input signal, wherein the OFDM input signal comprises a series of OFDM input symbols and the OFDM output signal comprises a series of OFDM output symbols; for each copy of the OFDM output signal, time align the OFDM output symbols to the OFDM input symbols of the corresponding OFDM input signal, and de-rotate a phase of the OFDM output signal with respect to the OFDM input signal; coherently sum and average the copies of the OFDM output signal; determine a variance of each copy of the OFDM output signal, and an ensemble variance of all of the copies of the OFDM output signal from the coherently summed and averaged copies of the OFDM output signal; discard any copies of the OFDM output signal whose variance differs from the ensemble variance by more than a threshold amount to produce a qualified set of copies of the OFDM output signal; determine a mean value of the qualified set of copies of the OFDM output signal; and determine a total noise power of the qualified set of copies of the OFDM output signal from the mean value.

In some embodiments, the method further comprises determining an error vector magnitude (EVM) of the qualified set of copies of the OFDM output signal.

In some versions of these embodiments, the method further comprises determining the EVM in the time domain.

In some versions of these embodiments, the method further comprises determining a first constituent of the EVM due to the analyzer.

In some versions of these embodiments, the method further comprises determining a second constituent of the EVM due to a source which supplies the copies of the OFDM input signal to the DUT.

In some versions of these embodiments, the method further comprises determining a third constituent of the EVM due to the DUT by removing from the EVM the first constituent due to the analyzer and the second constituent due to the source.

In some versions of these embodiments, the method further comprises determining a first component of the EVM due to the DUT produced by distortion, and determining a second component of the EVM due to the EVM produced by random noise.

In some embodiments, the method further comprises the processor nulling out unused tones in the copies of the OFDM output signal either prior to or after coherently summing and averaging the copies of the OFDM output signal.

As disclosed herein a signal analyzer may comprise: an input terminal and a processor. The input terminal is configured to receive repeated copies of an orthogonal frequency division multiplexed (OFDM) output signal produced by a device under test (DUT) in response to corresponding repeated copies of an OFDM input signal, wherein the OFDM input signal comprises a series of OFDM input symbols and the OFDM output signal comprises a series of OFDM output symbols. The processor is configured to: access the copies of the OFDM output signal of the DUT; for each copy of the OFDM output signal, time align the OFDM output symbols to the OFDM input symbols of the corresponding OFDM input signal, and de-rotate a phase of the OFDM output signal with respect to the OFDM input signal; coherently sum and average the copies of the OFDM output signal; determine a variance of each copy of the OFDM output signal, and an ensemble variance of all of the copies of the OFDM output signal from the coherently summed and averaged copies of the OFDM output signal; discard any copies of the OFDM output signal whose variance differs from the ensemble variance by more than a threshold amount, to produce a qualified set of copies of the OFDM output signal; determine a mean value of the qualified set of copies of the OFDM output signal; and determine a total noise power of the qualified set of copies of the OFDM output signal from the mean value.

In some embodiments, the processor is further configured to determine an error vector magnitude (EVM) of the qualified set of copies of the OFDM output signal.

In some versions of these embodiments, the processor is further configured to determine the EVM in the time domain.

In some versions of these embodiments, the processor is further configured to determine a first constituent of the EVM due to the signal analyzer.

In some versions of these embodiments, the processor is further configured to determine a second constituent of the EVM due to a source which supplies the copies of the OFDM input signal to the DUT.

In some versions of these embodiments, the processor is further configured to determine a third constituent of the EVM due to the DUT by removing from the EVM the first constituent due to the analyzer and the second constituent due to the source.

In some versions of these embodiments, the processor is further configured to determine a first component of the EVM due to the DUT produced by distortion, and determine a second component of the EVM due to the EVM produced by random noise.

In some embodiments, the processor is further configured to null out unused tones in the copies of the OFDM output signals either prior to or after coherently summing and averaging the copies of the OFDM output signal.

As disclosed herein, a tangible non-volatile storage medium has stored thereon instructions which when executed by a processor cause the processor to: access copies of an orthogonal frequency division multiplexed (OFDM) output signal of a device under test (DUT), wherein the DUT produces the copies of the OFDM output signal from corresponding copies of an OFDM input signal which is supplied to the DUT, wherein the OFDM input signal comprises a series of OFDM input symbols and the OFDM output signal comprises a series of OFDM output symbols; for each copy of the OFDM output signal, time align the OFDM output symbols to the OFDM input symbols of the corresponding OFDM input signal, and de-rotate a phase of the OFDM output signal with respect to the OFDM input signal; coherently sum and average the copies of the OFDM output signal; determine a variance of each copy of the OFDM output signal, and an ensemble variance of all of the copies of the OFDM output signal from the coherently summed and averaged copies of the OFDM output signal; discard any copies of the OFDM output signal whose variance differs from the ensemble variance by more than a threshold amount to produce a qualified set of copies of the OFDM output signal; determine a mean value of the qualified set of copies of the OFDM output signal; and determine a total noise power of the qualified set of copies of the OFDM output signal from the mean value.

In some embodiments, the instructions further cause the processor to determine an error vector magnitude (EVM) of the qualified set of copies of the OFDM output signal.

In some versions of these embodiments, the instructions further cause the processor to determine the EVM in the time domain.

In some versions of these embodiments, the instructions further cause the processor to determine a first constituent of the EVM due to an analyzer which receives the copies of the OFDM output signal.

In some versions of these embodiments, the instructions further cause the processor to determine a second constituent of the EVM due to a source which supplies the copies of the OFDM input signal to the DUT.

In some versions of these embodiments, the instructions further cause the processor to determine a third constituent of the EVM due to the DUT by removing from the EVM the first constituent due to the analyzer and the second constituent due to the source.

In some versions of these embodiments, the instructions further cause the processor to determine a first component of the EVM due to the DUT produced by distortion, and determine a second component of the EVM due to the EVM produced by random noise.

BRIEF DESCRIPTION OF THE DRAWINGS

The example embodiments are best understood from the following detailed description when read with the accompanying drawing figures. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

Figure 1:
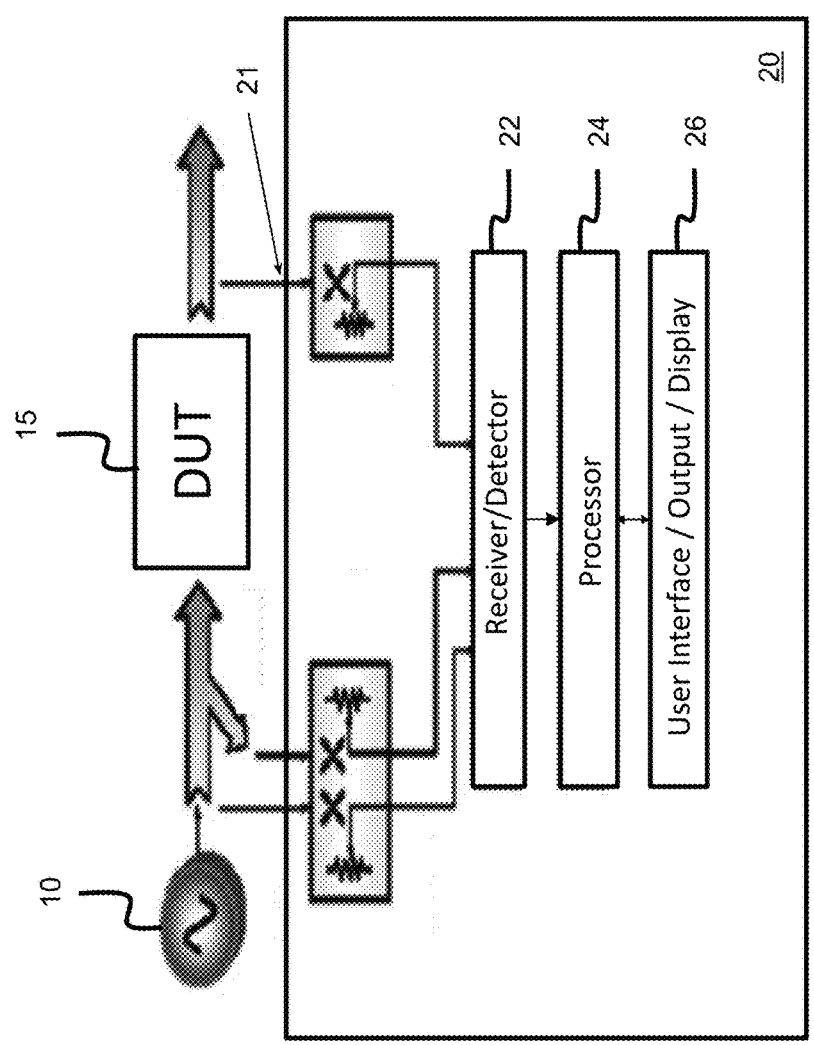
FIG. 1 is a functional block diagram illustrating an example embodiment of a network analyzer which may be employed for measuring error vector magnitude (EVM) performance of a device under test (DUT).
Figure 2:
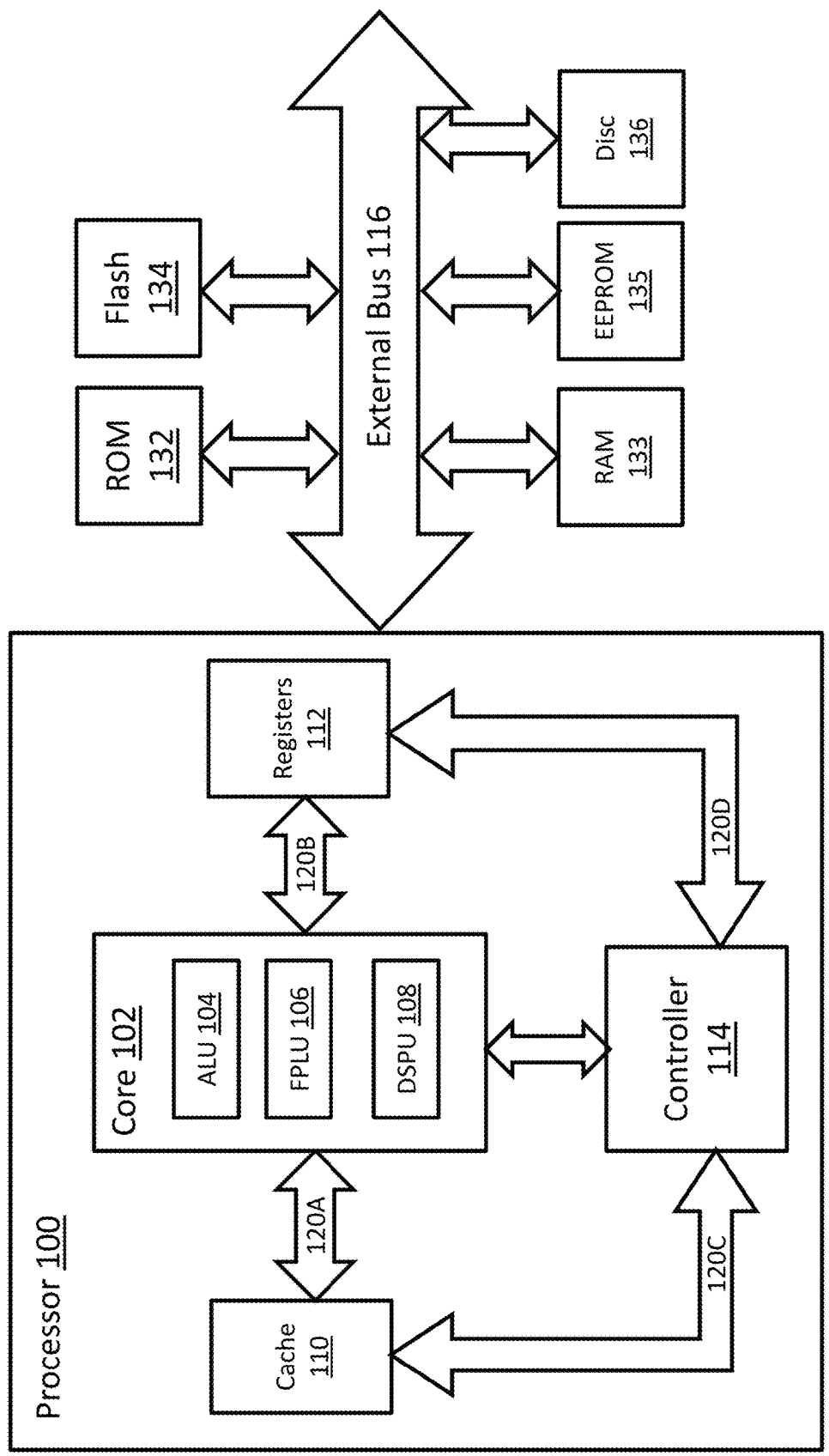
FIG. 2 shows an example embodiment of a processing system which may be employed in systems disclosed herein and to perform methods disclosed herein.

Before describing details of systems and methods for measuring an error vector magnitude (EVM) of a device under test, such as an amplifier or wireless mobile device, in the digital domain, to provide some context we first describe with respect to FIGS. 1 and 2 aspects of some example devices which may be employed in these systems and methods.

FIG. 1 is a function block diagram illustrating an example embodiment of a network analyzer 1 which may be employed for measuring error vector magnitude (EVM) performance of a device under test (DUT) 15, in particular an RF device. Here, DUT 15 may be a wireless phone, a WiFi transceiver, a power amplifier, or other another device which transmits an RF signal. Network analyzer 1 includes two major components: a signal generator 10 and a signal analyzer 20. Signal generator 10 may generate an RF input signal for DUT 15, and signal analyzer 20 may receive an RF output signal from DUT 15.

Signal analyzer 20 may include a receiver or detector 22, a processor 24, and a user interface 26 which may include a display and/or a data output, such as standard data interface, an Internet connection, a wireless connection (e.g., Wi-Fi), etc.

FIG. 1 also shows directional couplers associated with signal analyzer 20. In some cases, these may be omitted, especially when signal analyzer 20 only receives and analyzes the output RF signal from DUT 15, which in that case may be connected directly to receiver/detector 22 through a cable, or in some cases through an antenna connected to input port 21 and receiver/detector 22.

FIG. 2 shows an example embodiment of processing system 2 which may be employed in systems disclosed herein and to perform methods disclosed herein. Processing system 2 includes a processor 100 connected to one or more external storage devices via an external bus 116.

Processor 100 may be any suitable processor type including, but not limited to, a microprocessor (e.g., a general-purpose microprocessor) a microcontroller, a digital signal processor (DSP), a field programmable array (FPGA) where the FPGA has been programmed to form a processor, a graphical processing unit (GPU), an application specific circuit (ASIC) where the ASIC has been designed to form a processor, or a combination thereof.

Processor 100 may include one or more cores 102. Core 102 may include one or more arithmetic logic units (ALU) 104. In some embodiments, core 102 may include a floating-point logic unit (FPLU) 106 and/or a digital signal processing unit (DSPU) 108 in addition to or instead of ALU 104.

Processor 100 may include one or more registers 112 communicatively coupled to core 102. Registers 112 may be implemented using dedicated logic gate circuits (e.g., flip-flops) and/or any memory technology. In some embodiments registers 112 may be implemented using static memory. The register may provide data, instructions and addresses to core 102.

In some embodiments, processor 100 may include one or more levels of cache memory 110 communicatively coupled to core 102. Cache memory 110 may provide computer-readable instructions to core 102 for execution. Cache memory 110 may provide data for processing by core 102. In some embodiments, the computer-readable instructions may have been provided to cache memory 110 by a local memory, for example, local memory attached to external bus 116. In some embodiments, the computer-readable instructions may be stored on a tangible non-volatile storage medium such as disc 136 and may be transferred from disc 136 to local memory and from there to cache memory 110 for execution by processor 100. Here, disc 136 may be an optical or magnetic storage device. Cache memory 110 may be implemented with any suitable cache memory type, for example, metal-oxide semiconductor (MOS) memory such as static random-access memory (SRAM), dynamic random-access memory (DRAM), and/or any other suitable memory technology.

Processor 100 may include a controller 114, which may control input to processor 100 from other processors and/or components included in a system and/or outputs from processor 100 to other processors and/or components included in the system. Controller 114 may control the data paths in ALU 104, FPLU 106 and/or DSPU 108. Controller 114 may be implemented as one or more state machines, data paths and/or dedicated control logic. The gates of controller 114 may be implemented as standalone gates, FPGA, ASIC or any other suitable technology.

Registers 112 and cache 110 may communicate with controller 114 and core 102 via internal connections 120A, 120B, 120C and 120D. Internal connections may be implemented as a bus, multiplexor, crossbar switch, and/or any other suitable connection technology.

Inputs and outputs for processor 100 may be provided via external bus 116, which may include one or more conductive lines. External bus 116 may be communicatively coupled to one or more components of processor 100, for example controller 114, cache 110, and/or register 112.

External bus 116 may be coupled to one or more external memories. The external memories may include Read Only Memory (ROM) 132. ROM 132 may be a masked ROM, Electronically Programmable Read Only Memory (EPROM) or any other suitable technology. The external memory may include Random Access Memory (RAM) 133. RAM 133 may be a static RAM, battery backed up static RAM, Dynamic RAM (DRAM) or any other suitable technology. The external memory may include Electrically Erasable Programmable Read Only Memory (EEPROM) 135. The external memory may include Flash memory 134.

Although a detailed description of processing system 2 which may be employed in systems and to perform methods disclosed herein has been described above as a concrete example, in general some or all of the operations described herein may be performed by a general-purpose computer with any processor and memory, in particular a computer which operates with a standard operating system such as WINDOWS®, MACINTOSH® Operating System ("macOS"), UNIX, Linux, etc.

Described in greater detail below are embodiments of a system and method for coherent averaging of repetitive signals to measure one or more characteristics of the signal, such as the Error Vector Magnitude (EVM) and/or the Adjacent Channel Leakage Power (ACLR).

Figure 3:
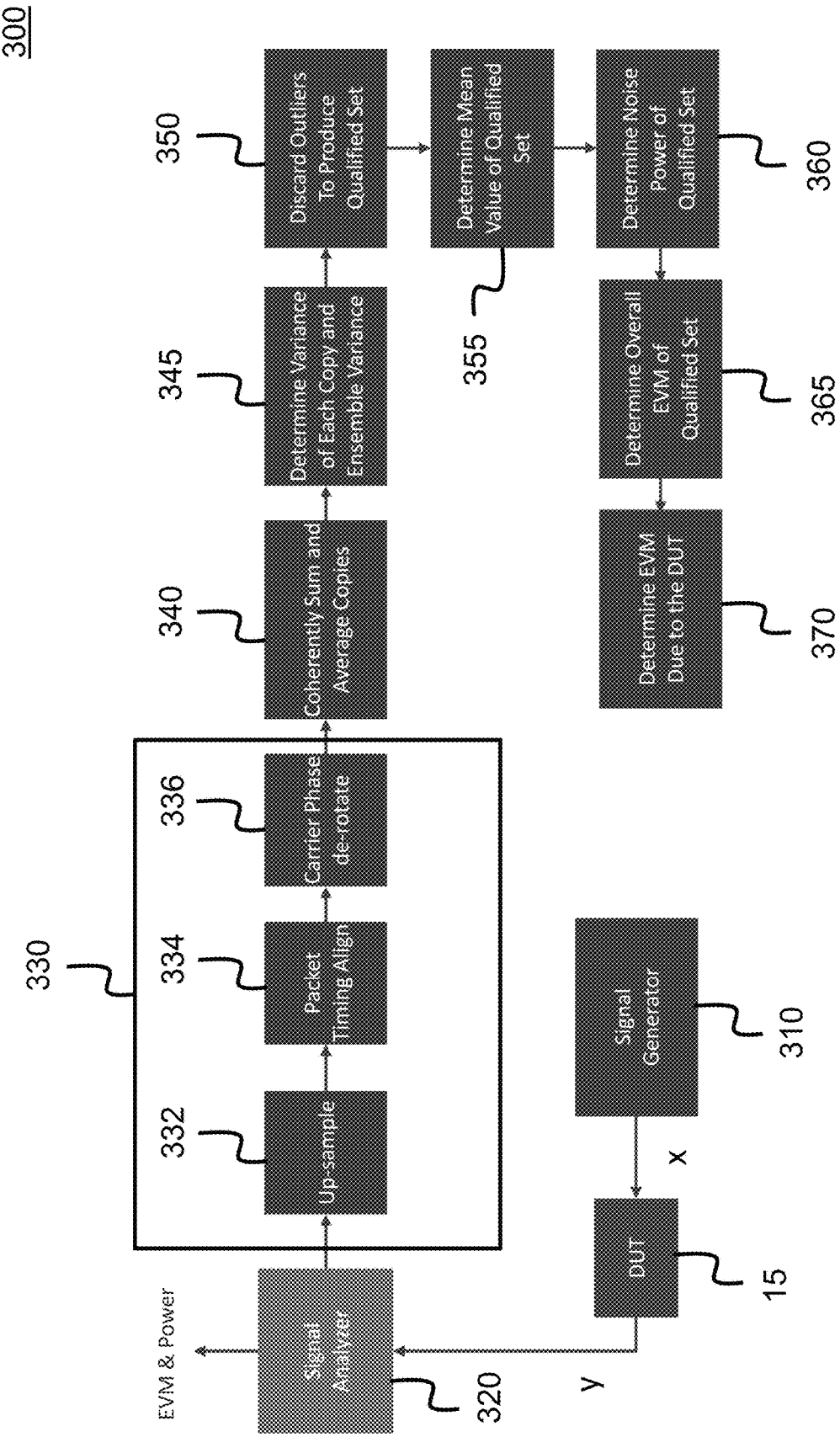
FIG. 3 shows an example embodiment of a processing arrangement for measuring one or more characteristics of an output signal from a DUT by employing coherent averaging of repetitive signals.

FIG. 3 shows an example embodiment of a processing arrangement 300 for measuring one or more characteristics of an output signal from a DUT 15 by employing coherent averaging of repetitive signals.

The arrangement 300 includes a source or signal generator 310, a signal analyzer 320, and a series of data processing modules which in some embodiments may be realized by a processing system such as processing system 2 of FIG. 2. The modules include a group of modules 330 which perform up-sampling 332, packet timing alignment 334, and carrier phase de-rotation 336 on each copy or repetition of an output signal y (e.g., of OFDM output signal) which is output from DUT 15 to signal analyzer 320 in response to an input signal x (e.g., an OFDM input signal) which is supplied to DUT 15 from source or signal generator 310. The modules also include: a module 340 for performing coherent summation and averaging of the up-sampled, aligned, and de-rotated copies or repetitions of the OFDM output signal y; a module 345 for determining a variance of each copy of OFDM output signal y from the mean obtained in module 340 and an ensemble variance from the mean; a module 350 for discarding outlier copies of the OFDM output signal y to produce a qualified set of copies; a module 355 for determining a mean value for the qualified set of copies of the output signal; a module 360 for determining the noise power in the qualified set of copies of the output signal; a module 365 for determining the EVM of the qualified set of copies of the output signal; and a module 370 for determining the contribution to the EVM of the qualified set of copies of the output signal due to DUT 15.

Described below are example embodiments of methods of coherent averaging that may be performed with the arrangement 300.

In some embodiments, the constituent EVMs of the DUT are extracted through a process of coherent averaging of repetitive signals wherein the random noise is separated from the Signal+Distortion under actual large signal conditions, and the EVMs of the Source and Analyzer are de-embedded. The repetitive signals are time and phase aligned prior to coherent averaging, with an optional digital over-sampling for finer alignment. Other embodiments are a) visualization and quantization of the DUT and Instrument noise floor and associated signal processing, b) identification and quantification of RF Phase Noise component in the noise floor, c) mitigation of sampling clock jitter effects of Source D/A and Analyzer A/D and visualization of related instrument fidelity.

1) Coherent Averaging and Removal of Outliers a. Repeated signals are collected after they are time aligned, carrier phase de-rotated and optionally phase noise compensated. They are called compensated signals or traces. Here, time alignment and phase de-rotation can be relative to the digital signal source (preferable), or one of the repeated signals.

b. The source and analyzer are phase locked using a common reference. If the DUT has frequency translation, it should also be phase locked to avoid phase or frequency ramp over measurements.

c. Compensated Signals are coherently summed to compute the Signal+Distortion as yMean, while suppressing the noise.

d. Excess noise detection is used to throw away any measured outlier compensated signals with too much variance relative to the Ensemble Variance. The excessive variance is due to phase noise spike, sampling jitter, noise spike, or instrument introduced glitch, instrument drift etc. The variance of each repetition is relative to the mean signal yMean. The ensemble variance is the mean variance of all the compensated signals. It is computed over combined Time+Repetition Index dimensions. If yMat is an S×R dimension matrix of compensated signals, S= #samples, R= #repetitions, then as an example:

yMean=mean(yMat,2); an S×1 matrix of the coherently averaged signal.

yError=yMat-yMean; an S×R matrix of noise for each trace.

rms_yError=rms(yError,1); a 1×R vector, of noise power of each trace.

mean_rms_yError=mean(rms_yError); a single number of ensemble average noise power.

BadData=find(rms_yError>1.1*mean_rms_yError);

yMat(:,BadData)=[ ]; a new set of Compensated Signals

The above description uses RMS and mean of RMS. It could also use mean square and mean of mean square. The above steps could be repeated for additional removal of outliers.

(2) Separation of a) Total Noise and b) Signal+Distortion a. After throwing away the outlier waveforms, the new mean of compensated signals (yMean) provides Signal+Distortion while suppressing the noise.

The coherent Avg after removing bad data:

yMean=mean(yMat,2); the coherent average signal.

yError=yMat-yMean; the Noise of each Repetition b. The mean PSD is computed as:

Ymean=fftshift(fft(yMean));

YmeanS=Ymean*conj(Ymean);

YmeanS_filt=MovAvgSymmetric(YmeanS, Navg); the neighborhood averaging to smoothen the spectrum. Navg=averaging window.

YmeanS_filt_db=10*log 10(YmeanS_filt);

c. The mean is subtracted from the new set of compensated signals to estimate noise signal for each trace (yError).

d. Then the FFT is computed for each noise signal, followed by RMS computation at each frequency bin across the repetition-index dimension (not frequency), to get the mean Total Noise (PSD) 'YErrorSmean_filt_dB.

YError=fft(yError); the noise of each repetition.

YErrorS=fftshift(YError*conj(YError)); the noise PSD of each repetition.

YErrorS_filt=MovAvgSymmetric(YErrorS,Navg); the smoothed noise PSD of each repetition.

YErrorSmean=mean(YErrorS,2); the mean noise PSD combining all repetitions.

YErrorSmean_filt_dB=10*log 10(MovAvgSymmetric(YErrorSmean,Navg)); the smoothed mean noise PSD combining all repetitions, in dB 3) Component EVMs Computation a. From previous steps, the Signal+Distortion and the noise components are separated using the coherent averaging method. They are used for computing the component EVMs as described below in Step 0 to Step 6.

b. The relative noise power is reduced by factor sqrt(N) from the Signal+Distortion, where N is number of signal repetitions. E.g., coherent averaging over 100 repetitions would yield a 20 dB noise reduction.

c. The EVM of Signal+Distortion is computed from the coherently averaged signal using a frequency domain or time domain method over frequency and as a total. It is noise-free EVM, considering only the distortion component.

d. Steps for computing the various component EVMs are described below.

In the discussion to follow, the following should be noted.

Note 1: All EVMs are referred to the analyzer input in the equations below. The signals captured from the DUT and from source directly by the signal analyzer, equalized to the ideal digital source waveform in order to minimize the EVM. The equalization response $G_{ls}(f)$ is determined using the input and output waveforms of the DUT in either the frequency domain or in the time domain. Unless explicitly stated, in the analysis below the EVM is determined in frequency domain after determining $G_{ls}(f)$. Aggregated EVM over occupied frequencies is then computed in the frequency domain as described in the end.

Note 2: Coherent averaging introduces amplitude bias due to phase noise dependent time jitter of the samplers in A/D (Analyzer) and D/A (Source). Using a channel sounding signal with the same coherent averaging for estimating the equalization response neutralizes the effect of the amplitude bias after the equalization of the measured repeated signals. When using a time domain technique for determining the equalization response Gls(f) and thereafter the EVM(f), the amplitude bias correction is automatically included as the computations are referred to the DUT input and not output.

Step 0: Total EVM.

Define: Et(f)=total EVM of output signal from the DUT, including contributions from the source and the analyzer over frequency. It is measured by the analyzer using either a frequency domain technique or a time domain technique, with the DUT driven by the source. It includes the EVM contributions from noise and distortion of the DUT, the source and the analyzer.

Definitions

Edut(f)=true EVM of DUT over frequency, which needs to be determined

Constituent EVMs of the DUT:

$Edut^2(f)=En^2(f)+Ed^2(f)$ where:

En(f)=EVM of DUT due to random noise component, which needs to be determined; and Ed(f)=EVM of DUT due to distortion component (deterministic, i.e., not random), which needs to be determined.

Derivations:

$$Et^2(f)=\text{Edut}^2(f)+Es^2(f)+Ea^2(f) \tag{1}$$

and:

$$Et^2(f)=En^2(f)+Ed^2(f)+Es^2(f)+Ea^2(f) \tag{2}$$

Es(f)=EVM due to the Source

Ea(f)=EVM due to the Analyzer, only from random noise, with distortion assumed to be negligible $Es^2(f)=Ens^2(f)+Eds^2(f)$ where Ens(f)=EVM of the source due to random noise Eds(f)=EVM of the source due to distortion (deterministic, i.e., not random).

Generally, Eds(f)<<Ens(f) especially after linearizing the source using digital predistortion, or when the source power<=0 dBm.

The constituent EVMs Eds(f) and Ens(f) of the source are not needed for determining those of the DUT but are useful for specifying the source. They can be measured using the coherent averaging based method like the one used for the DUT as described later.

In operation:

Step 1: Calibration of Analyzer EVM for DUT Output Power.

Na(f) is known random noise power spectral density of the analyzer, measured by terminating its RF input with 50 ohms, at the same internal signal-path setting used for measuring DUT's EVM at an output signal power spectral density power S(f).

S(f)=signal power spectral density, directly measured at above setting using the analyzer. Note that S(f) can be derived more accurately from coherent averaging that removes the noise power. From the measured Na(f), and computed or measured S(f), $Ea^2(f)$ is computed as:

$$Ea^2(f)=Na(f)/S(f). \tag{3}$$

Step 2: Calibration of Analyzer EVM for Source Output Power.

Like step 1 above, the analyzer's EVM $Ea2^2(f)$ is computed when driven directly by the source at same power level used to drive the DUT.

Step 3: Calibration of Source EVM.

The source's EVM Es2(f) is measured by the analyzer at the source power level used to drive the DUT. Then using the relation:

$$Es2^2(f)=Es^2(f)+Ea2^2(f)$$

The source's true EVM is computed as:

$$Es(f)=[Es2^2(f)-Ea2^2(f)]^{1/2}$$

Step 4: DUT EVM.

From Equation (1):

$$\text{Edut}(f)=[Et^2(f)-Es^2(f)-Ea^2(f)]^{1/2} \tag{4}$$

Step 5: Constituent EVM of DUT: Ed(f).

Random Noise suppression by Coherent Averaging.

The EVM of the DUT signal is measured after coherent averaging. Then, from Equation (2) with the random noise terms $En^2(f)$, $Es^2(f)$ and $Ea^2(f)$ suppressed due to coherent averaging, the measured EVM is:

$$Et(f)_{coherent\ average} = Ed(f) + 0 + 0 + 0$$

Therefore, the constituent EVM due to distortion is $$Ed(f) = Et(f)_{coherent\ average} \quad (5)$$

Computation of Ed(f) by Coherent Averaging.

Using the repeated signals $V_i[n]$, with i=repetition index up to R, n=time sample index, the coherent averaging based mean signal is computed (with $V_i[n]$ taken after time-alignment and phase de-rotation of each repeated signal):

$$V_{mean}[n] = \frac{1}{R}\sum_{i=1}^{i=R} V_i[n]$$

Ed(f) is the EVM of $V_{mean}[n]$ in the frequency domain, using $V_{mean}[n]$ as y[n] and the ideal source as x[n].

Signal Power Spectral Density, S(f).

$$V_{mean}(f) = FFT\{V_{mean}[n]\};$$

$$S(f) = E\{V_{mean}(f) \cdot V_{mean}(f)^*\},$$

where the expected value is taken by neighborhood averaging over f.

Step 6: Constituent EVM of DUT: En(f).

Computation of Noise by Coherent Averaging.

The noise signal of each repetition is computed as:

$$VN_i[n] = V_i[n] - V_{mean}[n].$$

In the frequency domain: $VN_i(f) = fft\{VN_i[n]\}$.

The noise power spectral density in frequency domain is:

$$Nt(f) = E\{VN_i(f) \cdot VN_i(f)^*\} = \frac{1}{R}\sum_{i=1}^{i=R} |VN_i|^2(f).$$

The noise power spectral density Nt(f) is the total of the individual noise power spectral density components due to source: Ns(f), the DUT: Nd(f) and the analyzer: Na(f), as given by the following: $Nt(f) = Ns(f) + Nd(f) + Na(f)$ Dividing by the signal power spectral density S(f):

$$Nt(f)/S(f) = Ns(f)/S(f) + Nd(f)/S(f) + Na(f)/S(f)$$

Using the definitions:

$$Ns(f)/S(f) = Es^2(f);$$

$$Nd(f)/S(f) = En^2(f);\ and$$

$$Na(f)/S(f) = Ea^2(f)$$

we get:

$$En(f)^2 = Nt(f)/S(f) - Es^2(f) - Ea^2(f)$$

$$En(f) = [Nt(f)/S(f) - Es^2(f) - Ea^2(f)]^{1/2}$$

Alternate Method for Determining En(f).

Using the relation:

$$Edut^2(f) = En^2(f) + Ed^2(f)$$

We get:

$$En(f) = [Edut^2(f) - Ed^2(f)]^{1/2}$$

Aggregate EVM over Occupied Bandwidth.

The EVM is reported as a single number aggregated over the occupied signal bandwidth that may be either continuous or segmented. By knowing the indices i∈ [i1, i2,i3, . . . iN] of the occupied frequencies, the aggregated EVM is computed as:

$$EVM = sqrt\left[\frac{1}{N}\sum_{i\in[i1,i2,i3,\ldots iN]} EVM^2(f_i)\right]$$

The indices 'i' are either known a priori during the construction of the ideal signal waveform or is determined from the power spectral density of the ideal signal by selecting only those frequencies whose powers are above a certain threshold. As an example, the threshold line could be placed say 6 dB below the peak power spectral density after performing a wide moving average filter on the PSD to flatten out spectral spikes.

Algorithms may also be included for:
(a) source and measured signal alignment with optional digital up-sampling;
(b) a spectral cross correlation modulation distortion based EVM computation (in lieu of standards based EVM computation); and
(c) an optional symbol timing jitter removal.

Spur Visualization and Removal Processing

Using Coherent Averaging based noise PSD extraction for 'YErrorSmean_filt_dB', we can visualize the spurs that are coherent using the analyzer. Since this PSD is the sum of all the trace PSDs, wherever there is a spur, the power will add up to a much larger amount compared to other regions where the powers are more randomly distributed. Note that this is a power addition and not vector addition. This is a powerful analysis tool to capture the analyzer, DUT and source spurs. The frequency bins at those spurs can be notched out for computing the EVM, though some spectral leakage may occur around those spurs if their frequencies are non-commensurate with the FFT raster.

Coherent Averaged Noise Suppression Visualization with Coherent Averaging

The noise is suppressed by 10*log 10(R) where R= #repetitions for coherent averaging. To visualize this suppressed noise floor, the vector (coherent) addition is performed for all the trace noise that is obtained from a second set of R traces. The trace noise for this set is obtained by subtracting a mean signal from the traces. However, the mean signal is obtained by coherent averaging from a first set of R traces. It is not obtained from the second set because then the vector sum of trace noise will be zero.

The spectral display of the coherent averaged noise floor is a powerful analysis tool to capture the signal analyzer, DUT and source spurs that add coherently.

Due to instrument drift, it may be preferable to time-interleave the first and second set of traces, instead of block-based measurement. This ensures that both mean signal and coherent noise undergo similar instrument state over a slow drift.

Carrier Phase De-Rotations.

Carrier phase rotations are not random but of a finite set if the source D/A converter and the analyzer A/D sampling clocks are commensurate with the phase locked carrier frequency.

Plotting the carrier phase de-rotations values as a histogram may be employed to show a discrete distribution that can get smeared when there is a) significant phase jitter between the source and the analyzer, and b) sampling clock jitter.

Using coherent averaging, it is possible to look deep below the regular noise at the pure Signal+Distortion spectrum of the DUT, and then add back computed DUT noise to get the final spectrum without analyzer noise. Then one can compute the out of band ACLR from this spectrum.

In some embodiments of coherent averaging, a wide band signal may be equalized for amplitude bias due to sampling clock jitter of the source D/A and the analyzer A/D using an equalizer response that has the same amplitude bias, as shown later. This may be done for all the traces that are captured for the coherent averaging method.

Constituent Noise Due to White Noise, LO Phase noise, Source D/A and Analyzer A/D Clock Jitter.

In some embodiments of the coherent averaging based constituent EVM analysis contributions from the white noise, LO phase noise, source D/A and analyzer A/D clock jitter may be separated from each other.

The extracted noise spectrum generally has a wideband flat shape due to thermal noise.

A noise pedestal within the occupied frequency band of the signal shows that the phase noise is significantly above the thermal noise. It could also be due to larger noise from DUT in the in-band region.

V-shape noise PSD within the occupied band indicates impact of sampling clock jitter of Zero-IF sampling system (homodyne architecture). A tilted V-shape is due to non-homodyne or non-zero IF sampling.

Figure 4B:
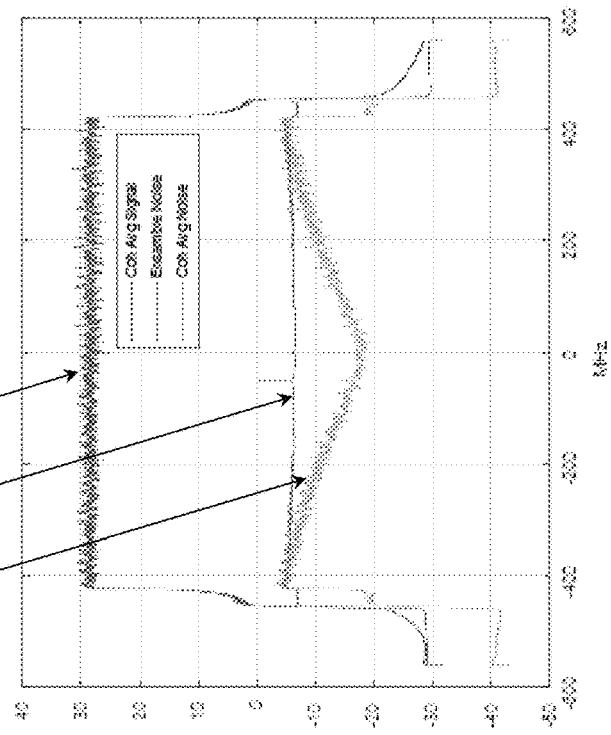
FIGS. 4A and 4B show plots illustrating an example of an effect that coherent averaging may have on measured and displayed signal and noise power spectral densities (PSDs).
Figure 4A:
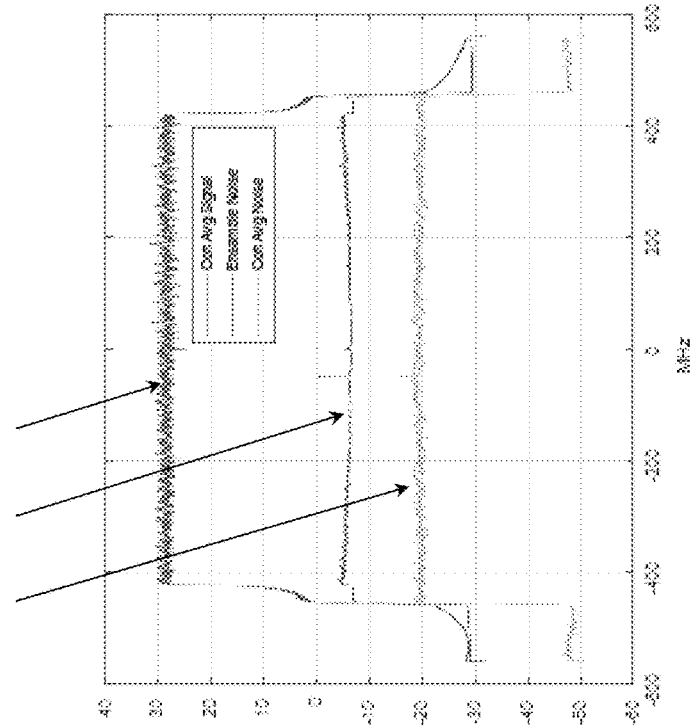

FIGS. 4A and 4B show plots illustrating an example of an effect that coherent averaging may have on measured and displayed signal and noise power spectral densities (PSDs).

FIG. 4A shows example plots when the first set and second set of traces are interleaved, as discussed above. Plot 410-A shows the PSD of the coherent averaged signal. Plot 412-A shows the PSD of the ensemble noise. Plot 414-A shows the PSD of the coherent averaged noise, illustrating an improvement of about 13 dB due to coherent averaging.

FIG. 4B shows example plots when coherent averaging is performed in block mode, as discussed above. Plot 410-B shows the PSD of the coherent averaged signal. Plot 412-B shows the PSD of the ensemble noise. Plot 414-B shows the PSD of the coherent averaged noise, illustrating the improvement due to coherent averaging.

Figure 5:
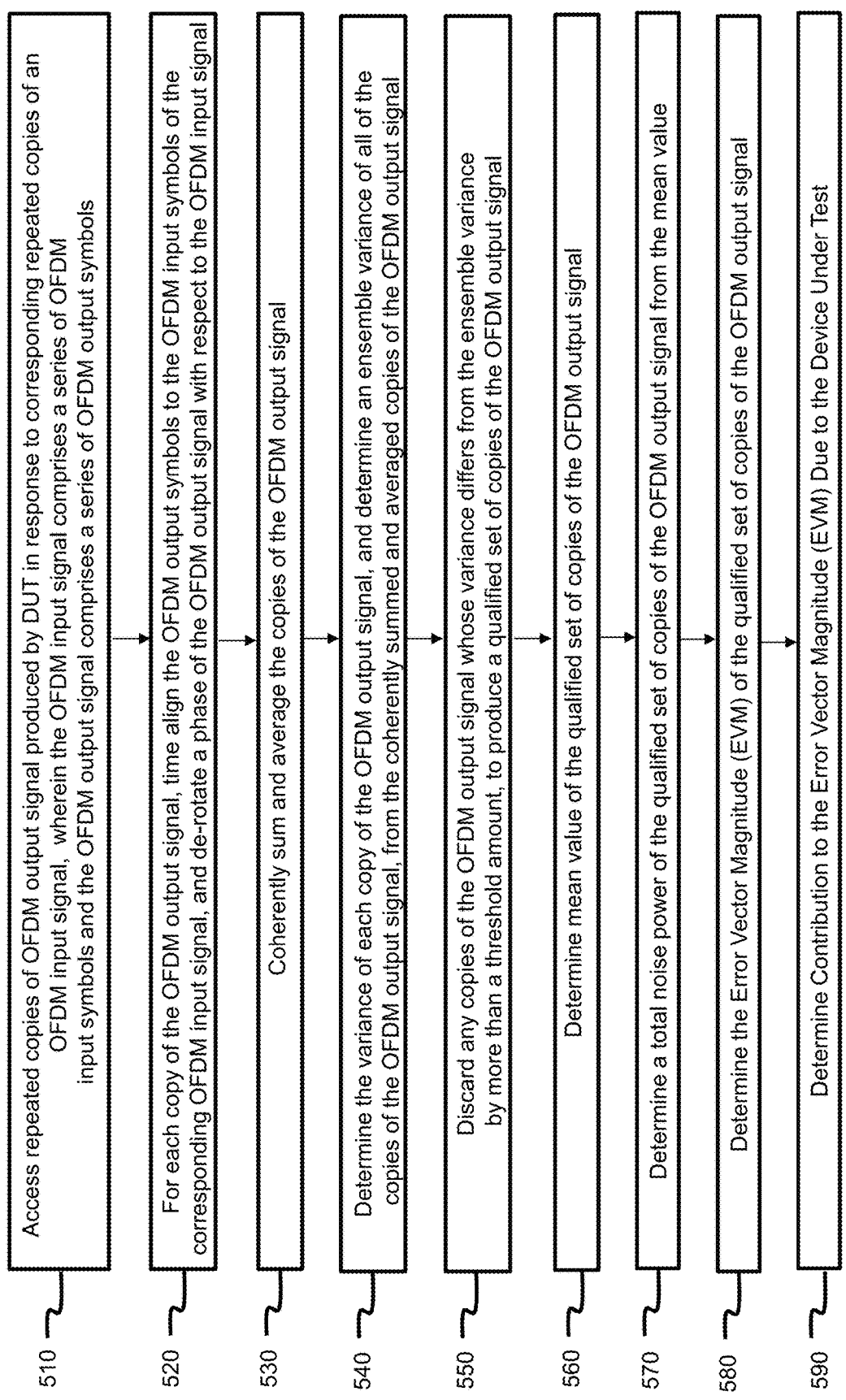
FIG. 5 is a flowchart of an example embodiment of a method of measuring one or more characteristics of an output signal from a DUT by employing coherent averaging or repetitive signals.

FIG. 5 is a flowchart of an example embodiment of a method of measuring one or more characteristics of an output signal from a DUT by employing coherent averaging of repetitive signals.

An operation 510 includes accessing repeated copies of an OFDM output signal produced by a DUT in response to corresponding repeated copies of an OFDM input signal, wherein the OFDM input signal comprises a series of OFDM input symbols and the OFDM output signal comprises a series of OFDM output symbols. Here, the repeated copies of the OFDM output signal may differ from each other due to phase noise spikes, sampling jitter, noise spikes, instrument introduced glitches, instrument frequency drifts, etc., caused by the signal generator and/or the analyzer.

An operation 520 includes, for each copy of the OFDM output signal, time aligning the OFDM output symbols to the OFDM input symbols of the corresponding OFDM input signal, and de-rotating a phase of the OFDM output signal with respect to the OFDM input signal.

An operation 530 includes coherently summing and averaging the copies of the OFDM output signal.

An operation 540 includes determining the variance of each copy of the OFDM output signal, and determining an ensemble variance of all of the copies of the OFDM output signal, from the coherently summed and averaged copies of the OFDM output signal.

An operation 550 includes discarding any copies of the OFDM output signal whose variance differs from the ensemble variance by more than a threshold amount, to produce a qualified set of copies of the OFDM output signal. Here the threshold can be adjustable by a user of an instrument with is being used to acquire and analyze the OFDM output signal.

An operation 560 includes determining a mean value of the qualified set of copies of the OFDM output signal.

An operation 570 includes determining a total noise power of the qualified set of copies of the OFDM output signal from the mean value.

An operation 580 includes determining the Error Vector Magnitude (EVM) of the qualified set of copies of the OFDM output signal. In some embodiments, this is done in the frequency domain. In other embodiments, this is done in the time domain.

An operation 590 includes determining the contribution to the Error Vector Magnitude (EVM) of the output signal due to the device under test (DUT). In some embodiments, operation 590 may include determining a first constituent of the EVM due to the analyzer which receives and analyzes the repeated copies of the OFDM output signal, and may further include determining a second constituent of the EVM due to a source which supplies the copies of the OFDM input signal to the DUT. In that case, operation 590 may include removing from the EVM of the output signal the first constituent due to the analyzer and the second constituent due to the source to determine the contribution to the EVM of the output signal due to the DUT.

In some embodiments, method 500 include an additional operation of nulling out unused tones in the OFDM input symbols and the estimated OFDM input symbols prior to operation 590.

In some embodiments where parameters other than EVM, such as ACLP, are being measured with coherent averaging, operations 580 and 590 may be omitted.

In some embodiments, some or all of the operations 510-690, and/or the various other operations described above, may be performed by a processing system comprising a processor and memory, for example the processing system 2 of FIG. 2, executing computer-readable instructions which are stored in memory. In some cases, those computer-readable instructions may be stored on a tangible non-volatile storage medium, such as disc 136 of FIG. 2.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A method implemented using a signal analyzer comprising a processor and memory, the method comprising:
accessing repeated copies of an orthogonal frequency division multiplexed (OFDM) output signal produced by a device under test (DUT) in response to corresponding repeated copies of an OFDM input signal, wherein the OFDM input signal comprises a series of OFDM input symbols and the OFDM output signal comprises a series of OFDM output symbols;

for each copy of the OFDM output signal, time aligning the OFDM output symbols to the OFDM input symbols of the corresponding OFDM input signal, and de-rotating a phase of the OFDM output signal with respect to the OFDM input signal;

summing coherently and averaging the copies of the OFDM output signal;

determining a variance of each copy of the OFDM output signal, and an ensemble variance of all of the copies of the OFDM output signal from the coherently summed and averaged copies of the OFDM output signal;

discarding any copies of the OFDM output signal whose variance differs from the ensemble variance by more than a threshold amount to produce a qualified set of copies of the OFDM output signal;

determining a mean value of the qualified set of copies of the OFDM output signal; and determining a total noise power of the qualified set of copies of the OFDM output signal from the mean value.

2. The method of claim 1, further comprising determining an error vector magnitude (EVM) of the qualified set of copies of the OFDM output signal.

3. The method of claim 2, further comprising determining the EVM in the time domain.

4. The method of claim 2, further comprising determining a first constituent of the EVM due to the analyzer.

5. The method of claim 4, further comprising determining a second constituent of the EVM due to a source which supplies the copies of the OFDM input signal to the DUT.

6. The method of claim 5, further comprising determining a third constituent of the EVM due to the DUT by removing from the EVM the first constituent due to the analyzer and the second constituent due to the source.

7. The method of claim 6, further comprising determining a first component of the EVM due to the DUT produced by distortion, and determining a second component of the EVM due to the EVM produced by random noise.

8. The method of claim 1, further comprising nulling out unused tones in the copies of the OFDM output signal prior to coherently summing and averaging the copies of the OFDM output signal.

9. A signal analyzer, comprising:
an input terminal configured to receive repeated copies of an orthogonal frequency division multiplexed (OFDM) output signal produced by a device under test (DUT) in response to corresponding repeated copies of an OFDM input signal, wherein the OFDM input signal comprises a series of OFDM input symbols and the OFDM output signal comprises a series of OFDM output symbols;
a processor configured to:
access the copies of the OFDM output signal of the DUT;
for each copy of the OFDM output signal, time align the OFDM output symbols to the OFDM input symbols of the corresponding OFDM input signal, and de-rotate a phase of the OFDM output signal with respect to the OFDM input signal;
coherently sum and average the copies of the OFDM output signal;
determine a variance of each copy of the OFDM output signal, and an ensemble variance of all of the copies of the OFDM output signal from the coherently summed and averaged copies of the OFDM output signal;
discard any copies of the OFDM output signal whose variance differs from the ensemble variance by more than a threshold amount, to produce a qualified set of copies of the OFDM output signal;
determine a mean value of the qualified set of copies of the OFDM output signal; and
determine a total noise power of the qualified set of copies of the OFDM output signal from the mean value.

10. The signal analyzer of claim 9, wherein the processor is further configured to determine an error vector magnitude (EVM) of the qualified set of copies of the OFDM output signal.

11. The signal analyzer of claim 10, wherein the processor is further configured to determine the EVM in the time domain.

12. The signal analyzer of claim 10, wherein the processor is further configured to determine a first constituent of the EVM due to the signal analyzer.

13. The signal analyzer of claim 12, wherein the processor is further configured to determine a second constituent of the EVM due to a source which supplies the copies of the OFDM input signal to the DUT.

14. The signal analyzer of claim 13, wherein the processor is further configured to determine a third constituent of the EVM due to the DUT by removing from the EVM the first constituent due to the analyzer and the second constituent due to the source.

15. The signal analyzer of claim 14, wherein the processor is further configured to determine a first component of the EVM due to the DUT produced by distortion, and determine a second component of the EVM due to the EVM produced by random noise.

16. The signal analyzer of claim 9, wherein the processor is further configured to null out unused tones in the copies of the OFDM output signals prior to or after coherently summing and averaging the copies of the OFDM output signal.

17. A tangible non-volatile storage medium having stored thereon instructions which when executed by a processor cause the processor to:
access copies of an orthogonal frequency division multiplexed (OFDM) output signal of a device under test (DUT), wherein the DUT produces the copies of the OFDM output signal from corresponding copies of an OFDM input signal which is supplied to the DUT, wherein the OFDM input signal comprises a series of OFDM input symbols and the OFDM output signal comprises a series of OFDM output symbols;
for each copy of the OFDM output signal, time align the OFDM output symbols to the OFDM input symbols of the corresponding OFDM input signal, and de-rotate a phase of the OFDM output signal with respect to the OFDM input signal;
coherently sum and average the copies of the OFDM output signal;
determine a variance of each copy of the OFDM output signal, and an ensemble variance of all of the copies of the OFDM output signal from the coherently summed and averaged copies of the OFDM output signal;
discard any copies of the OFDM output signal whose variance differs from the ensemble variance by more than a threshold amount to produce a qualified set of copies of the OFDM output signal;
determine a mean value of the qualified set of copies of the OFDM output signal; and
determine a total noise power of the qualified set of copies of the OFDM output signal from the mean value.

18. The tangible non-volatile storage medium of claim 17, wherein the instructions further cause the processor to determine an error vector magnitude (EVM) of the qualified set of copies of the OFDM output signal.

19. The tangible non-volatile storage medium of claim 18, wherein the instructions further cause the processor to determine the EVM in the time domain.

20. The tangible non-volatile storage medium of claim 18, wherein the instructions further cause the processor to determine a first constituent of the EVM due to an analyzer which receives the copies of the OFDM output signal.

* * * * *